United States Patent
Edwards et al.

[11] Patent Number: 5,873,659
[45] Date of Patent: Feb. 23, 1999

[54] METHOD AND APPARATUS FOR PROVIDING A PRINTER HAVING INTERNAL QUEUE JOB MANAGEMENT

[76] Inventors: Steve Michael Edwards, 2414 Richmond Rd. Apt. 82, Lexington, Ky. 40502; Gail Marie Songer, 2319 Harrods Pointe Trace; James Francis Webb, 3808 Heimbaugh La., both of Lexington, Ky. 40514

[21] Appl. No.: 637,016
[22] Filed: Apr. 24, 1996
[51] Int. Cl.⁶ .................................................. B41J 5/30
[52] U.S. Cl. ............................. 400/61; 395/114; 400/76
[58] Field of Search ................. 400/61, 76; 395/114, 395/112, 113, 115, 116

[56] References Cited

U.S. PATENT DOCUMENTS

| | | | |
|---|---|---|---|
| 4,825,405 | 4/1989 | Makino | 400/61 |
| 5,050,098 | 9/1991 | Brown | 395/114 |
| 5,075,875 | 12/1991 | Love et al. | 395/117 |
| 5,084,875 | 1/1992 | Weinberger et al. | 371/291 |
| 5,164,842 | 11/1992 | Gauronski et al. | 358/401 |
| 5,214,772 | 5/1993 | Weinberger et al. | 395/575 |
| 5,220,566 | 6/1993 | Ikenoue | 370/112 |
| 5,220,674 | 6/1993 | Morgan et al. | 395/800 |
| 5,226,112 | 7/1993 | Mensing et al. | 395/114 |
| 5,247,623 | 9/1993 | Sun | 395/325 |
| 5,271,065 | 12/1993 | Rourke et al. | 382/1 |
| 5,303,336 | 4/1994 | Kageyama et al. | 395/114 |
| 5,323,393 | 6/1994 | Barrett et al. | 370/85.8 |
| 5,333,286 | 7/1994 | Weinberger et al. | 395/575 |
| 5,353,388 | 10/1994 | Motoyama | 395/117 |
| 5,361,265 | 11/1994 | Weinberger et al. | 371/29.1 |
| 5,371,837 | 12/1994 | Kimber et al. | 395/114 |
| 5,438,528 | 8/1995 | Emerson et al. | 364/580 |
| 5,550,957 | 8/1996 | Davidson, Jr. et al. | 395/114 |
| 5,717,841 | 2/1998 | Farrell | 395/115 |
| 5,718,520 | 2/1998 | Mackay | 400/61 |

FOREIGN PATENT DOCUMENTS

| | | | |
|---|---|---|---|
| 0575 168 A1 | 12/1993 | European Pat. Off. | G06F 3/12 |
| 6-110708 | 4/1994 | Japan . | |

OTHER PUBLICATIONS

Network Printing Alliance Protocol, A Printer/Host Control Specification, Level 1, Revision N, Feb. 11, 1994, Developed By The Network Printing Alliance.

HP JetDirect Network Interface Configuration Guide, Hewlett–Packard Manual Part No. J2371–90001, 1993, pp. iv–ix and Section 2 Software Installation and Configuration for Novell Netware Networks, pp. 2–2 through 2–18.

(List continued on next page.)

Primary Examiner—Eugene Eickholt
Attorney, Agent, or Firm—Davidson & Gribbell

[57] ABSTRACT

An improved printing system having a host computer and a printer is provided in which the printer has a memory of sufficient size capable of temporarily storing multiple print jobs. The host computer can be utilized by a user or a Network Administrator to "view" the contents of a print queue within the printer, in which the queue holds one or more print jobs as these print jobs await printing. The host can inform the printer when a particular print job in the queue is to be deleted or undeleted. Deleted jobs are effectively removed from the queue and are not printed; however, such deleted jobs can be reinstated (or "undeleted") during the time interval between the delete command being received at the printer and when this job would have become the immediate subject for being interpreted, and the particular print job (which really never lost its place in the queue) returns to the queue and has its data sent to the interpreter when its turn to be dispatched occurs, and finally becomes printed. The various stages of a print job migrating through the printer are used to inform the user/Network Administrator at the host as to the status of the entire print queue, upon request by the user/Network Administrator. The list of current jobs in the printer's queue and the "location" of each of these print jobs is displayed on the monitor at the host in a form that identifies the job name and the status of each job. In one preferred embodiment, a "list box" of the host's display monitor can present up to twenty-five (25) current jobs in the order that they will be operated on by the printer.

35 Claims, 8 Drawing Sheets

OTHER PUBLICATIONS

HP JetDirect EX External Network Interface Configuration Guide, Hewlett–Packard Manual Part No. J2382–90101, 1993, pp. 7–12 and Section 2 Novell NetWare Networks, pp. 2–2 through 2–36.

Lexmark WinWriter 600 User's Reference, Manual No. SA40–0779–00, 1993, Chapter 2 Using the Windows Printing System, pp. 11–26 and Chapter 3 Checking Print Status, pp. 27–39.

Common Printer Access Protocol (CPAP) Specification, Jun. 16, 1995, Digital Equipment Corporation.

Standard Signaling Method for a Bi–directional Parallel Peripheral Interface for Personal Computers, IEEE P 1284 D2.00, Sep. 10, 1993, Institute of Electrical and Electronic Engineers, pp. 1–119.

METHOD AND APPARATUS FOR PROVIDING A PRINTER HAVING INTERNAL QUEUE JOB MANAGEMENT

TECHNICAL FIELD

The present invention relates generally to the use of printers connected to a host computer and is particularly directed to printers of the type which contain sufficient memory to accept multiple print jobs while printing. The invention is specifically disclosed as a printing system in which print jobs that have already been accepted into a queue by a printer, but not yet printed, can be manipulated from a host computer.

BACKGROUND OF THE INVENTION

Printers receive print data from a source, such as a single host computer or from a network that contains at least one host computer or network server. One recent development with respect to laser printers is the addition of a "memory option," which is an internal memory device such as flash RAM (Random Access Memory) or a hard disc drive, in which each type of memory can store files containing printed data. In some conventional printers, the memory device (e.g., hard disk) is of a sufficient size to store many print jobs at one time. Moreover, the "normal" temporary memory storage device (i.e., typically volatile RAM) used to store incoming print jobs may also be of a sufficient size to store many print jobs at one time, even as the printer is in the process of printing an earlier-received print job.

Another recent development with respect to laser printers is the use of a network adapter that allows bi-directional communication with host computers over the network. Such bi-directional communication would typically be made using a protocol known as the Network Printer Alliance Protocol (NPAP) which provides a means for returning status information from a laser printer to a host computer. The NPAP and bi-directional capabilities and memory storage capabilities of such laser printers, particularly the Lexmark Model 4039 Plus™ and Model OPTRA™, manufactured by Lexmark International, Inc., are quite broad. Details of the published Network Printer Alliance Protocol are contained in the NPAP Specification Level 1, Revision N, dated Feb. 11, 1994. This NPAP Specification is incorporated herein by reference.

In typical desktop personal computer (PC) environments, print jobs are submitted (via either a direct connection or via a network) to a printer that contains sufficient memory to accept more than one entire print job, and by using this capability, a quick "screen release" is achieved. The term "screen release" represents the concept that, once a print job is accepted by a printer, the desk top PC is "released" by that printer, and the PC is no longer waiting for the printer to continue accepting the data. Until conventional printers accept all of the data for a particular print job from the host computer (i.e., the PC), the host computer can be unusable by its human user ("locked up") until the active printing session is complete. An active printing session becomes "complete" generally when the print job has been completely accepted by the printer. At that time, the printer's hardware communicates to the host PC's hardware that the job has been accepted.

The desire to achieve a quick screen release has produced various solutions in the printer field of art. One conventional solution is to implement a "print spooler" in various operating systems, including PC operating systems (e.g., Microsoft Windows 95™, IBM OS/2™), as well as network operating systems (e.g., Novell Netware™, and IBM LAN Server™). Another conventional solution is to add more memory to the printers so as to allow the printers to completely accept various print jobs long before they are physically printed.

Print spoolers typically have a user interface at the host computer that allows the human user to "view" the state of the print jobs that have been submitted for printing. While a particular print job remains in the queue, most conventional PC print spoolers have the ability to "cancel" such print jobs, and in some products, there is also the ability to change the order in which the jobs will be printed. However, once a particular print job leaves the queue at a conventional host computer (by being communicated to the selected printer, e.g., over a network), the host computer no longer has control over the disposition of that print job. In other words, once the print job leaves the queue at the host computer and is transferred to a conventional printer, that print job cannot be "intercepted" by the host computer, even though it may be residing in the printer's queue for some considerable time before being printed.

SUMMARY OF THE INVENTION

Accordingly, it is a primary object of the present invention to provide a printing system in which the host computer can "view" the state of a print job that currently resides in the queue of a printer, which is either directly connected to the host or connected via a network.

It is another object of the present invention to provide a printing system in which print jobs that are stored in a queue at the printer can be cancelled by a host computer, thereby being essentially eliminated from the print queue.

It is a further object of the present invention to provide a printing system in which print jobs that are stored in a queue and which have been "deleted" or "cancelled" by a host computer can, thereafter, become "undeleted," thereby being placed back into the print queue for later printing.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved printing system having a host computer and a printer is provided in which the printer has a bi-directional data communications capability and a memory of sufficient size capable of temporarily storing multiple print jobs in the form of data files. The printer preferably meets the standards of the Network Printer Alliance Protocol (NPAP) which defines industry standards for bi-directional communications between a host computer and a printer, either over a network or directly between such computer and printer. In the present invention, the host computer can be utilized by a user or a Network Administrator to "view" the contents of a print queue within the printer, in which the queue holds one or more print jobs as these print jobs await printing. Before the host can view the contents of the printer's queue, the host must inform the printer that it desires to monitor the printer's internal queue by sending a "Turn On Job Transition Alerts" message to the printer, either over a network, or directly to the printer through a parallel or serial interface. Once the printer has been alerted as such, the printer will automatically send Job Transition Alerts to each host computer on the system that has enabled that printer to receive these alerts, every time certain status changes occur for print jobs at the printer. Examples of these Job Transition Alerts are as follows: (1) when the job is first received by the printer and "created" within the printer; (2) at the beginning of processing the job (i.e., when the job initially goes through raster image processing (RIP); (3) when the job begins printing; and (4) when the printing of the job has been completed. The host computer can also send a message to the printer informing the printer that the host is no longer interested in monitoring the internal print queue of the printer, thereby disabling the Job Transition Alert feature.

As part of each Job Transition Alert, the printer uniquely identifies each print job with several identifiers, which are used by the host computer to relate jobs together so as to keep the user interface (i.e., the monitor screen) consistent and more understandable. These identifiers are also used by the host to later inform the printer when a particular print job is to be deleted or undeleted. When the host sends either a "delete" or "undelete" command to the printer, the printer "marks" the pertinent print job either for deletion or undeletion. In the case of a delete command, assuming this particular job is still in the printer's queue, the individual print job is "marked" for deletion, although it is not literally erased immediately from the memory system of the printer. Instead, the job is merely marked as "killed" until its turn to be dispatched to an interpreter comes up, and at that time the data for that print job is flushed (discarded) so that the next print job in the queue can be immediately operated on by the interpreter. During the time interval between the delete command being received at the printer and when the resulting killed job becomes the immediate subject for being interpreted, the host computer may send down the undelete command, at which time this print job would be restored, more or less as if it had never been killed in the first place. After the undelete command has been received at the printer, the particular print job (which really never lost its place in the queue) returns to the queue and has its data sent to the interpreter when its turn to be dispatched occurs.

The various steps of a print job within the printer are used at the host to inform the user/Network Administrator as to the status of the entire print queue, when a particular command is entered by the user/Network Administrator at the host. To observe the current status, the user/Network Administrator enters a "Job Query" command, which is sent to the printer of interest. The printer then returns a message containing a linked list of job structures relating to the print jobs presently in the printer, including those in the printer's queue. The "location" of each of the print jobs within the printer is also returned to the host, and this information is displayed on the monitor at the host in a form that identifies the job name and the status of each job. In one preferred embodiment, a "list box" of the host's display monitor can present up to twenty-five (25) current jobs in the order that they will be operated on by the printer.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
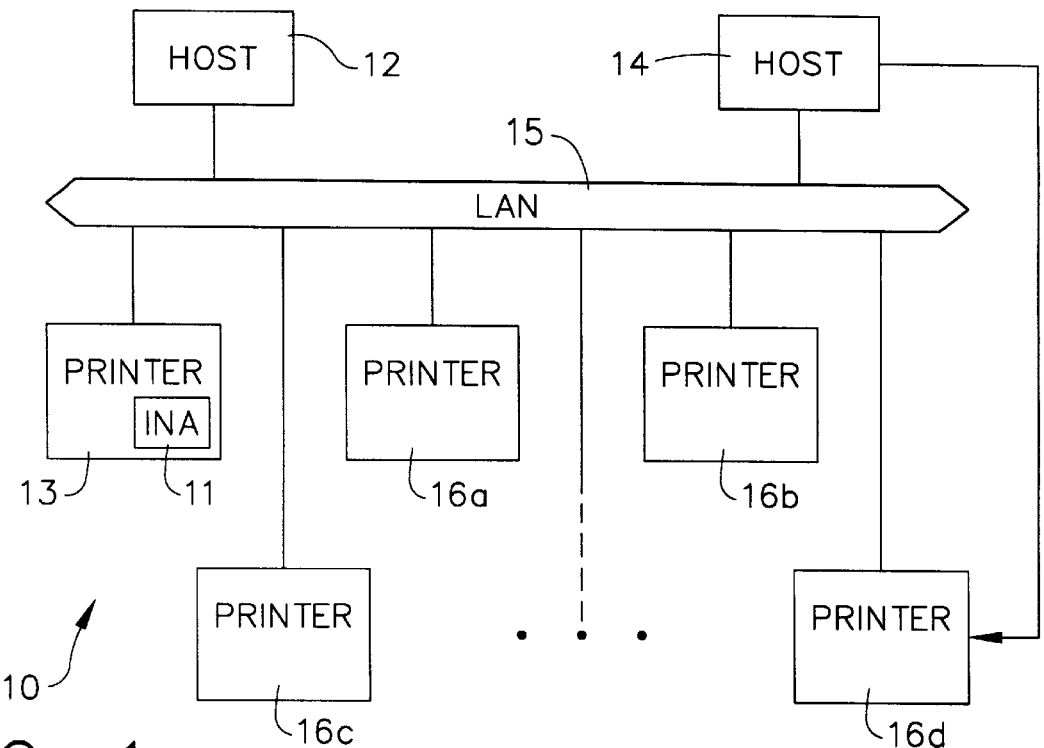
FIG. 1 is a diagrammatic view of a network system having multiple host computers and multiple printers, as relevant to the present invention.

Referring now to the drawings, FIG. 1 shows an exemplary interface between multiple host computers 12 and 14 and multiple printers, generally designated by the index numerals 13, 16a, 16b, 16c, and 16d. Printer 13 includes an internal network adapter (INA) 11, located within the printer housing and the other printers also preferably include such an INA. INA 11 is connected to host computers 12 and 14 through a network, such as the local area network (LAN) designated by the index numeral 15. INA 11 is preferably of a type described in a co-pending commonly-assigned U.S. patent application, Ser. No. 08/350,860, titled MULTIPLE VIRTUAL PRINTER NETWORK INTERFACE, filed on Dec. 7, 1994, now U.S. Pat. No. 5,550,957, and which is expressly incorporated by reference herein.

The host computers 12 and 14 can be installed in close proximity to one or more of the printers of FIG. 1, however, when operated according to the principles of the present invention, such host computers can be located quite remote from these printers. The overall system, generally designated by the index numeral 10, can be spread in practical use across an entire building, or across several buildings. Each of the printers 13, 16a, 16b, 16c, and 16d, may be of the same type or of different models, but are preferably manufactured by Lexmark International, Inc. located in Lexington, Ky.; such preferred printers can be either monochromatic, such as Lexmark Models 4039 plus, or OPTRA, or could be color printers such as the Model Optra C™.

In all cases, it is preferred that the printers of system 10 have bi-directional capabilities and that they operate according to the industry standard known as the Network Printing Alliance Protocol (NPAP). The NPAP includes a capability in which a particular manufacturer can provide optional features using "extensions," in which each extension includes a command that will be properly understood only by that particular manufacturer's printer. For example, extensions used by Lexmark printers may include in each NPAP packet communicated over the LAN 15 a command byte having a value of E0 in hexadecimal. Printers manufactured by Lexmark International Inc. will respond to such commands written under the Lexmark extension, but printers manufactured by other companies would usually ignore any packet that contained the E0 command byte.

Figure 2:
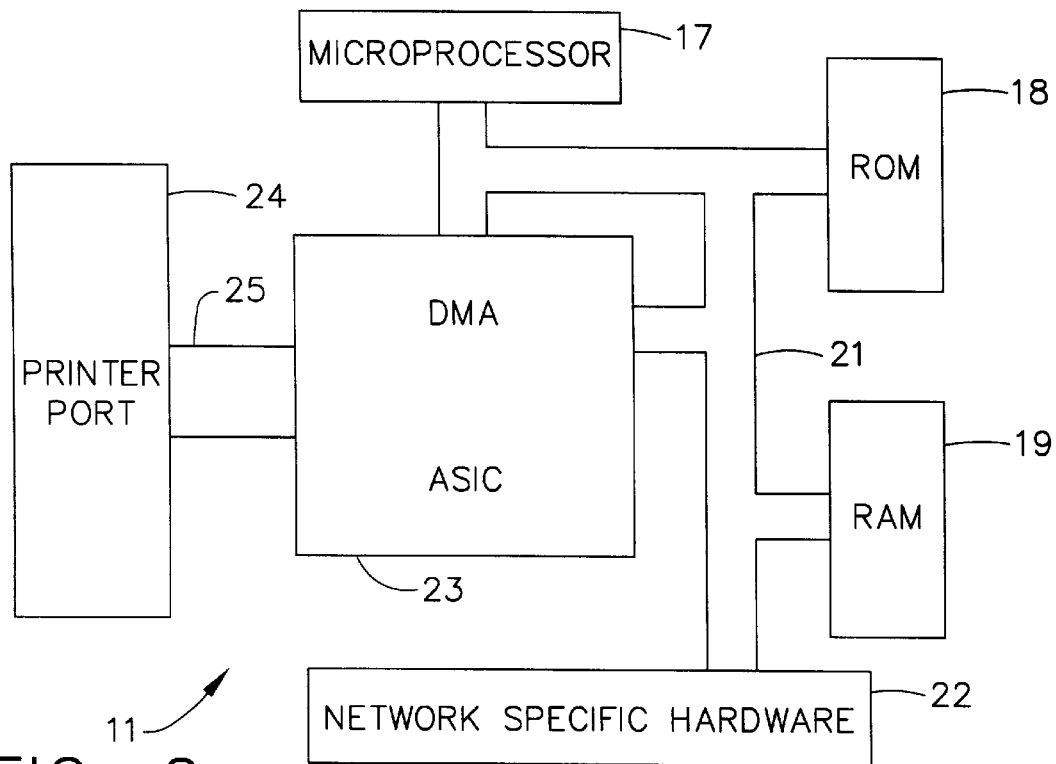
FIG. 2 is a block diagram of the internal network adapter that resides inside at least one of the printers of FIG. 1.

Referring now to FIG. 2, the internal network adapter (INA) 11 includes a microprocessor 17 and associated read only memory (ROM) 18 and random access memory (RAM) 19, accessible to the microprocessor on a bus 21. In the present form of adapter, the microprocessor 17 is an Intel 80186 microprocessor; and host data received at a network specific hardware interface 22 is transferred by a direct memory access (DMA) controller ASIC 23 into the RAM 19. The DMA operation may be controlled by the microprocessor 17 or by the network specific hardware 22, dependent upon the network hardware platform to which the INA 11 is attached. Data read from the network specific hardware 22 into the RAM 19 is subsequently transferred across a printer port 24 by the DMA controller ASIC 23.

In the illustrated system, the network operating system is Novell Netware 2.2 or 3.11 or later. As shall be described subsequently, the host computers operating on the Novell Operating System network are set up to send NPAP-compliant commands to a particular "socket", or logical address, of the network specific hardware 22. Therefore, non-NPAP information, received at a different socket, can be transferred to the printer port 24 without processing in the manner that NPAP commands are processed by the microprocessor 17. The NPAP information is processed by the microprocessor 17 in accordance with the present invention, as shall be described subsequently.

To communicate data to the printer port 24, the data is presented on data lines, and one mode of a number of modes of communication is established by command lines. The data lines and command lines are collectively designated 25. Settings of the command lines can place the port 24 into data mode, menu mode, NPAP status mode or Device Status Alert (DSA) mode. In data mode, data is transferred across the printer port 24 to provide page information for print jobs. In menu mode, printer operator panel information is transferred across the printer port 24 from the printer controller to the INA. In NPAP status mode, NPAP-compliant commands are sent from the INA to the printer controller over the printer port 24, with the port remaining in NPAP status mode until an appropriate response is received from the printer controller. In setting DSA mode, the INA responds to a request from the printer controller to be allowed to send a status alert. To do this the INA sets the printer port into DSA mode so that the printer can send the Device Status Alert to the INA.

Figure 3:
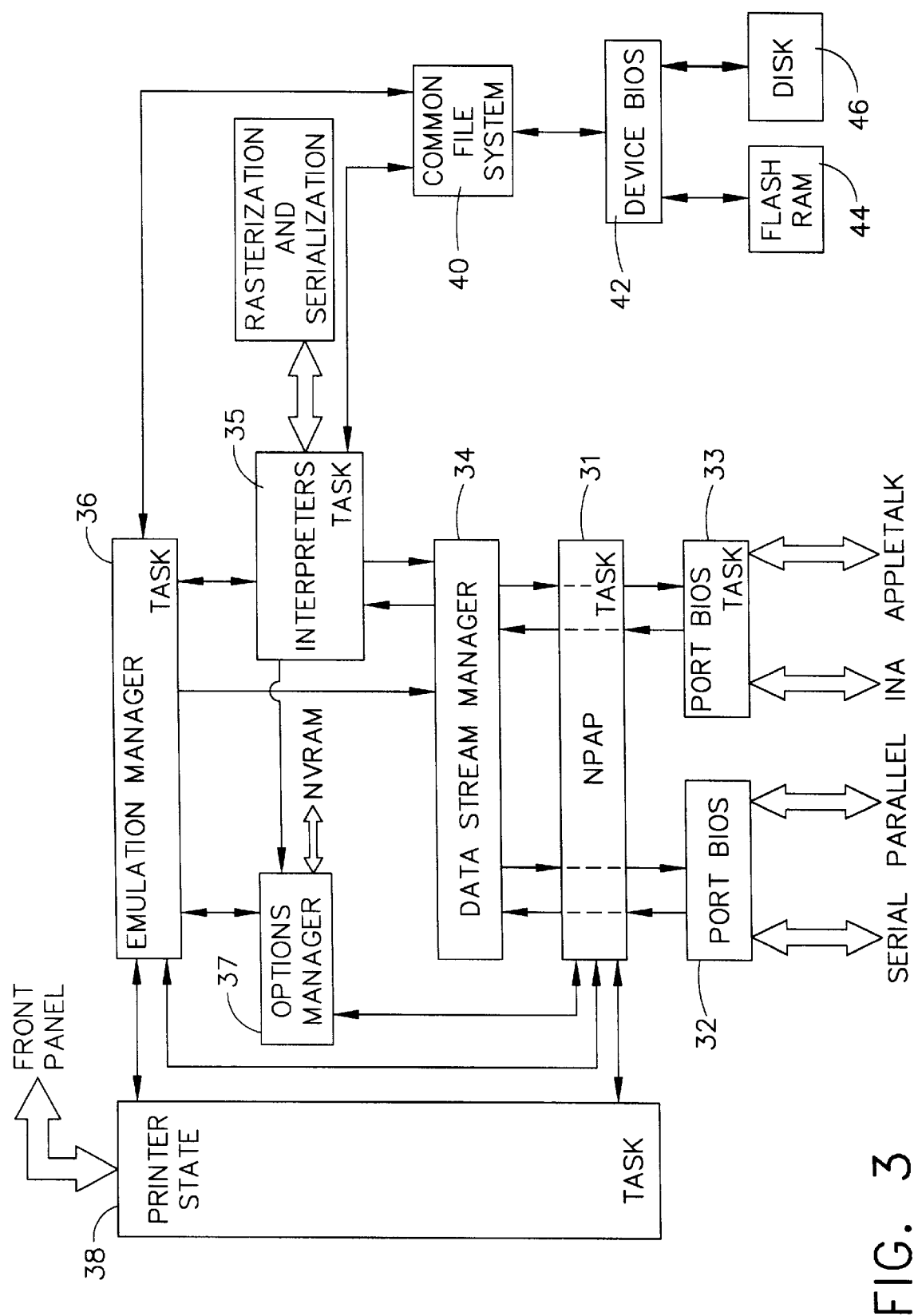
FIG. 3 is a functional block diagram of a controller for the printers depicted in FIG. 1, as relevant to the present invention.

With reference now to FIG. 3, a laser printer for use with the present invention includes a printer controller, the relevant portions of which are shown functionally. The microprocessor-based controller performs functions which include a number of tasks, the relevant ones of which are indicated in the figure, and a number of libraries of code which may be called by the tasks to perform various functions. The tasks are activated by timer counts or interrupts to perform functions, as shall be described.

The exemplary printer controller is capable of effecting the usual printer functions such as maintaining a control panel, interpreting incoming print jobs received in one or more printer control languages, and rasterizing and serializing the interpreted data to drive a laser printer engine. The exemplary controller includes the ability to communicate through parallel, serial and network ports bi-directionally using NPAP. The principal task for handling NPAP-compliant commands and data is the NPA Task 31.

The NPA Task 31 performs the functions of handling commands and data in the NPAP (Network Printing Alliance Protocol) format. The NPA Task supplies printer status information to direct attached and network attached host computers and receives requests for such information from the host computers. The NPA Task 31 is activated periodically by a timer, and when it is activated the NPA Task calls the Port BIOS 32 for the serial and parallel ports and the Port BIOS 33 for the INA port or Appletalk port to determine if there is received data at one or more of the ports. If an NPA command is received, the NPA Task 31 responds through the appropriate port either directly or after obtaining needed information from another function in the printer controller. Before describing operation of the NPA Task in more detail, its state as being active or inactive will be described.

The NPA Task may be "on", "off" or "auto" for each port, serial, parallel, INA, or Appletalk. If the NPA Task is off, print data is directly provided from the Port BIOS 32 or 33 to the Data Stream Manager, as shall be described. If the NPA Task is on, then only data in NPAP format will be passed through (after removal of NPAP wrappers) to the Data Stream Manager, with other inputs being rejected. If the NPA Task is in auto mode, then non-NPAP data will be passed through, and the NPA Task processes NPAP commands and data.

When none of the interpreters 35 are running to provide data for subsequent rasterization and serialization in the printer, the Emulation Manager Task 36 looks for print data at a port to direct to the appropriate interpreter. In the absence of the NPA Task 31, the Emulation Manager 36 calls Data Stream Manager 34 functions to transfer print data from the Port BIOS 32 or 33 to a buffer. If the NPA Task is on for a particular port, the Data Stream Manager 34 accesses data from an NPA Task buffer for that port. The Emulation Manager and Data Stream Manager also cooperate to associate a "job structure" with each print job received at a port. The job structure includes an identification number for the print job, the number of pages to be printed, and information on resolution and other specifics. The job structure data is also capable of being modified during the printing process to update the status of the job.

The Emulation Manager 36 also cooperates with the Data Stream Manager 34 to route each print job to the appropriate interpreter (such as a PostScript or a PCL interpreter) for that print job. The Data Stream Manager passes the print job data in the appropriate language to the selected interpreter until the end of the job, when the Data Stream Manager provides an end-of-job condition to the interpreter. When the interpreter is finished with the print job, it indicates this to the Emulation Manager Task, so that the job structure data can be modified if desired. The interpreted print jobs are provided on a page by page basis to graphics engine software and print mechanism hardware for eventual rasterization of the pages to be printed and serialization of the bit map information to the print mechanism. As used herein, it will be understood that the terms "print job data" or "print job information" refer to anything used to formulate a print job, including such data as: ASCII text information, fonts, macros, symbol sets, or datastream (e.g., PCL, PostScript, PPDS, and PJL).

A Common File System (CFS), designated by the index numeral 40, is provided to control the reading and writing of data from and to the memory devices of the printer. The Common File System 40 preferably interfaces with the Emulation Manager 36 and with the memory device BIOS 42, which performs the physical transfer of data to and from the memory devices. Typical memory devices in a laser printer are Read Only Memory (ROM), font cards installed by a user/Network Administrator to customize a laser printer, flash RAM 44, and hard disk drives 46.

The Options Manager Library 37 provides a high level interface through NVRAM BIOS to non-volatile RAM in the printer. Options Manager 37 is used by the Emulation Manager Task 36 in creating job structure information where such information is derived from NVRAM values. The NPA Task 31 also can communicate with the Options Manager 37 to read and write NVRAM settings.

The Printer State Task 38 first learns of outside (to the controller code) events occurring in the printer. The Printer State Task 38 notes, for example, if the printer cover has been opened and orchestrates providing this information to the front panel and to any other users of such information such as the NPA Task 31. The Printer State Task will become aware of certain conditions due to hardware interrupts to the processor, while other status information is checked by the Printer State Task 38 on a polling basis. Printer configuration changes, Device Status Alerts, and changes to the printer front panel are passed from the Printer State Task 38 to the NPA Task 31 for communication to attached host computers.

It will be understood that other hardware and software configurations for implementing the laser printer 13 could be substituted for the illustrated embodiment without departing from the principles of the present invention. This is particularly true for the arrangement of software/firmware used by laser printer 13, as depicted in FIG. 3—the Options Manager 37 and its method of controlling the NVRAM could be designed to operate in various manners, while still effectively performing the same tasks.

The preferred laser printer 13 will include an operator control panel which can be either manually-accessed by a local user, or remotely-accessed over the LAN by a Network Administrator. Such laser printers are currently available, an example of which is the Model OPTRA™, manufactured by Lexmark International, Inc.

It will be understood that the precise embodiments illustrated in FIG. 2 and 3 are not required to perform the functions of the present invention, however, to utilize the NPAP industry standard, a laser printer must have bi-directional communications capability, and it must have the capability to store configuration information in a memory (preferably a non-volatile memory) that can be configured from a remote host computer. Furthermore, such a laser printer should have the capability of having its configuration information contents uploaded into a host computer, so that the host computer can store that same configuration information upon its own storage media, such as in a file residing on a hard disk drive. Once a file is created at the host computer, it will be understood that the contents of such file can either be directly downloaded to other laser printers on the network, or that the file's contents could be manipulated so that individual operating characteristics of a laser printer can be modified by a Network Administrator, although that extra individual manipulation capability may not be desirable in certain circumstances.

Figure 4A:
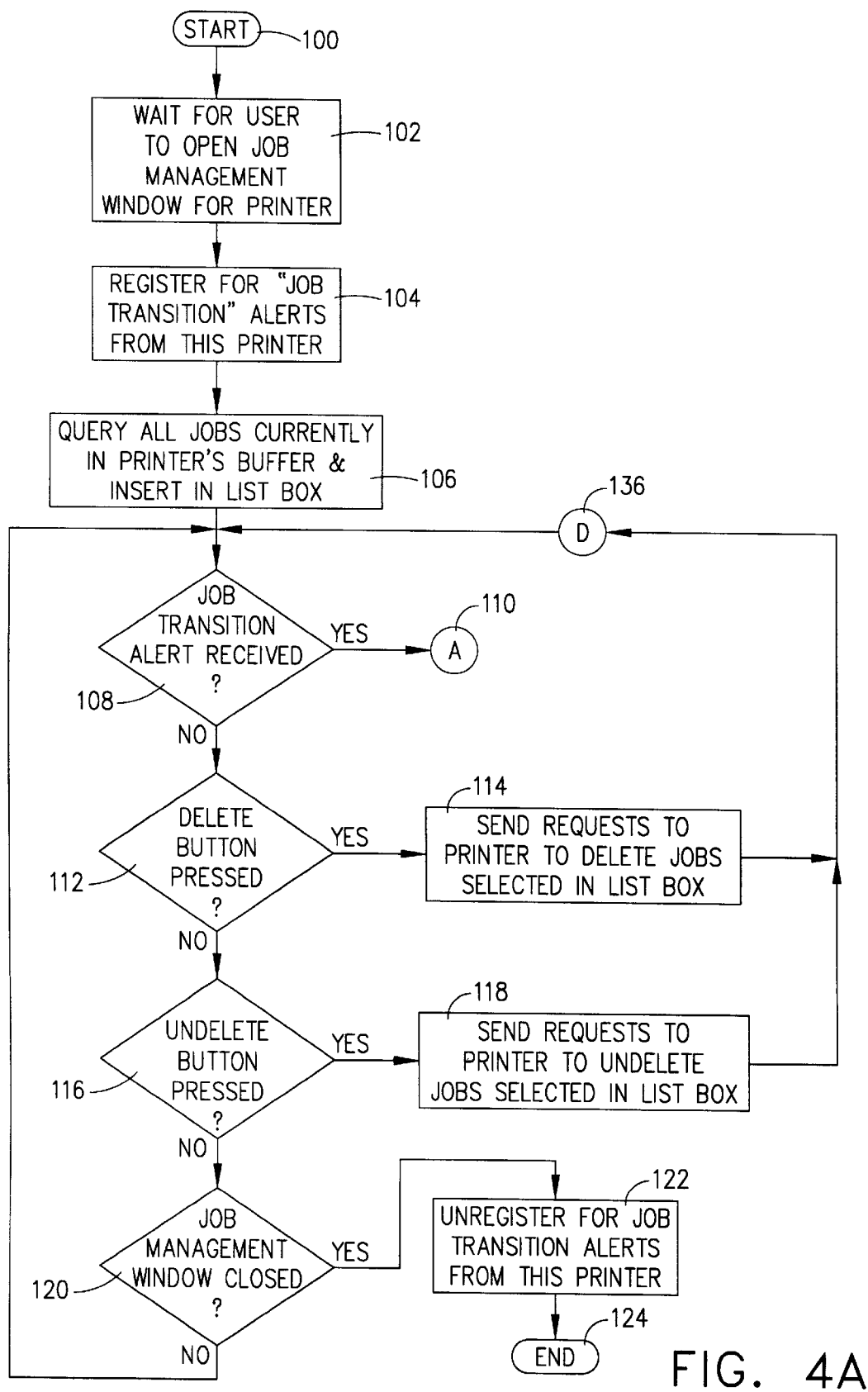
FIGS. 4A and 4B represent a flow chart of the operation of one of the host computers of FIG. 1, depicting the logical steps to perform the necessary commands related to interfacing with one of the printers of FIG. 1, for internal queue job management functions, according to the principles of the present invention.
Figure 4B:
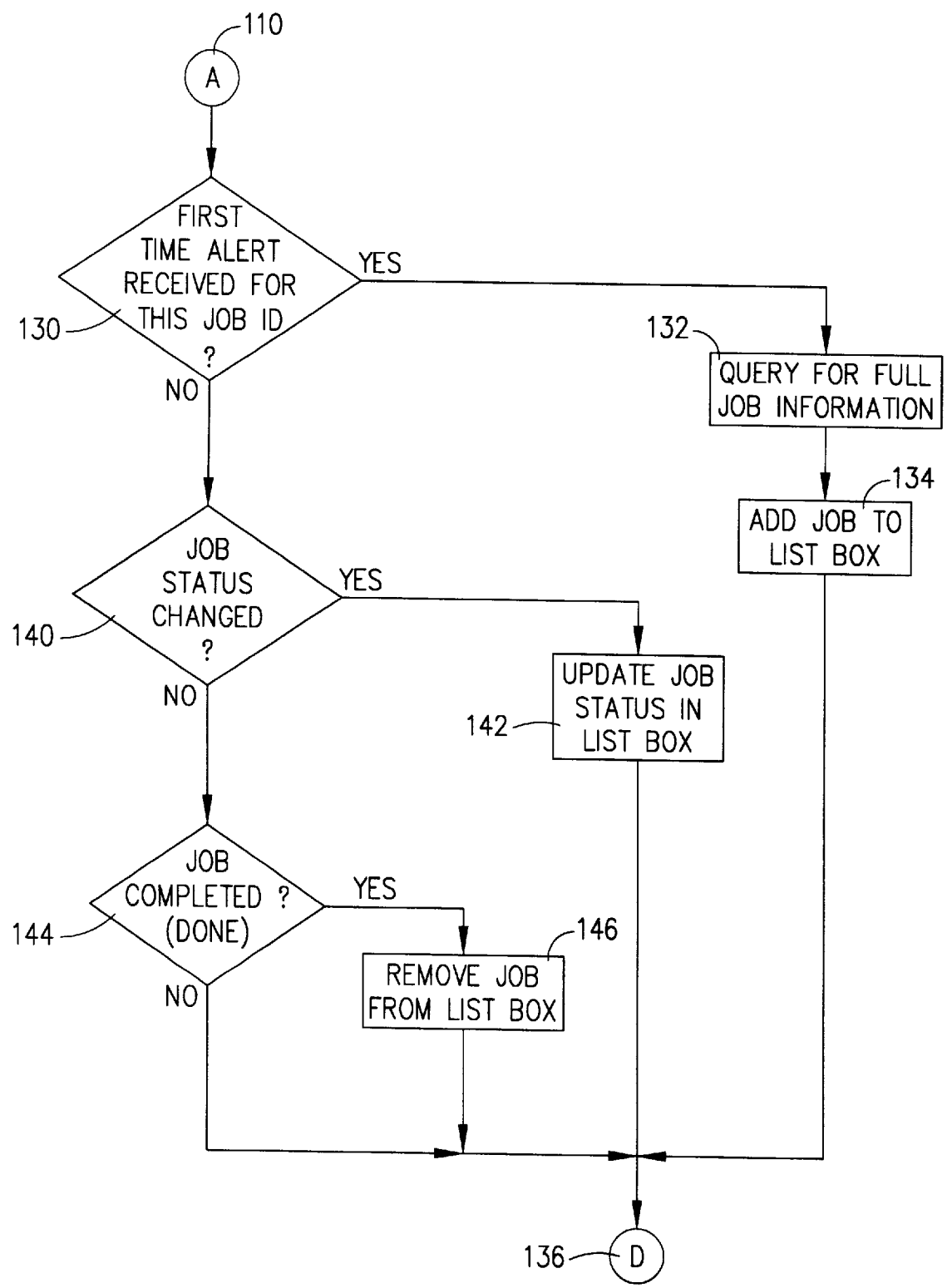

FIG. 4 depicts a flow chart of the steps that a host computer (e.g., host 12) must undergo to perform the logical operational steps involved in the printer's internal queue "Job Management," which involves Job Transition Alerts. A user or Network Administrator (either person can perform these operations) must access a computer program at the host 12, which preferably is a WINDOWS-compatible program such as MARKVISION®, produced by LexMark International, Inc. located in Lexington, Ky. The pertinent portion of the MARKVISION program starts at a function block 100 on FIG. 4A. It will be understood that MARKVISION or other similar programs are typically multitasking in nature, and can perform many functions virtually simultaneously. At a function block 102, this portion of the MARKVISION program waits for the user to "open" a Job Management window for a particular printer. In reality, the MARKVISION computer program is performing many other tasks while performing this "waiting" step at function block 102.

The logic flow then arrives at a function block 104 where the host computer "registers" for Job Transition "alerts" from this particular printer 13. In other words, once function block 102 "opens" a Job Management window for a particular printer, function block 104 registers with that printer (by sending an appropriate message) so that the host 12 will receive these Job Transition Alerts.

The next step is to query all jobs currently in the printer's buffer, and this information will be inserted in a "list box." This is performed at a function block 106, and the list box referred to is merely a display at the host computer's monitor screen that shows several of the jobs in the printer's buffer in a list-type format. This query can be for "full" information for the first twenty-five (25) jobs in the printer, which would be a command type "E033" or it could be for a list of all job identifiers that presently reside in the printer, regardless of how many print jobs currently are in that queue (which would be a command type "E036.") Assuming this query is for full information, the user/Network Administrator may, as an option, limit the parameters to find the first twenty-five (25) jobs having only certain characteristics, such as jobs that are directed toward a certain type of interpreter (e.g., POSTSCRIPT™, or other constraints that can be used to limit the type of search when making this query. When the host 12 desires a full information query from one of the printers, an NPAP command for a "Query Jobs, Active or Queued" message is transmitted from the host to the particular printer of interest, and in the illustrated embodiment, this message has a format shown in Table #1, below:

TABLE 1

5-5-5 Query Jobs, Active or Queued

Command: Lexmark Extension
Subcommand: Query Jobs, Active or Queued

| Byte | Value - Hex | Description | Notes |
|---|---|---|---|
| | | Host Commmand | |
| 1 | A5 | Start of Packet Byte | Packet Header |
| 2 | 00 08 | Length in Bytes (Does not include these 2 bytes nor the SOP byte) | |
| 1 | Unsigned Byte | Flag | |
| 1 | E0 | Command: Lexmark Extension | |
| 1 | 33 | Subcommand: Query Jobs, Active or Queued | Data Field |
| 1 | Unsigned Byte | Logical Unit Number (Interpreter)<br>xx    Return job statistics for this logical unit number (interpreter)<br>FF    Return job statistics for all logical unit LU ID | |
| 2 | Unsigned Word | Requested Job ID<br>0000    Return job statistics for all jobs for the above specified logical unit number(s)<br>xxxx    Return job statistics for a specific job for the above specified logical unit number. | |
| 2 | Unsigned Word | Maximum Number of Job Statistics to Return - Limit the printer to host message to the number of jobs that meet the above logical unit number and Job ID criteria. | |
| | | Printer Response | |
| 1 | A5 | Start of Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Lexmark Extension | |
| 1 | 33 | Subcommand: Query Jobs, Active or Queued | Data Field |
| 1 | Unsigned Byte | Length of printer's serial number, not including this byte(h) | |
| h | ASCII | Printer's Serial Number | |
| 2 | Unsigned Word(i) | Number of Jobs to be returned(g) | |
| 2 | Unsigned Word | Maximum Length of Job Record (300) | |
| 2 | Unsigned Word | Length of Job Record. Job 1 | Job 1 |
| 1 | Unsigned Byte | LU ID | |
| 2 | Unsigned Word | Job ID | |
| 1 | Unsigned Byte | Port ID | |
| 1 | Unsigned Byte | Breakable flag | |
| 2 | Unsigned Word | Parent ID | |
| 2 | Unsigned Word | Processing Time since Start of Job | |
| 1 | Bit Encoded Byte<br>Bit 1<br>Bit 3 | Job State<br>Delete<br>Held(not currentty supported) | |
| 1 | Bit Encoded Byte<br>Bit 0<br>Bit 1<br>Bit 2 | Job Location - Link<br>Job Not in Link Buffer<br>Job Waiting in Link Buffer<br>Job is Being Read from Link Buffer | |
| 1 | Bit Encoded Byte<br>Bit 0<br>Bit 1<br>Bit 2 | Job Location - Rip<br>Job is Not Current Job<br>Reserved<br>Job is Current Job being Ripped | |
| 1 | Bit Encoded Byte<br>Bit 0<br>Bit 1<br>Bit 2 | Job Location - Print Queue<br>Job Not in Print Queue<br>Job Waiting in Print Queue<br>Job is Being Printed | |
| 1 | Bit Encoded Byte<br>Bit 0<br>Bit 1<br>Bit 2<br>Bit 3<br>Bit 4 | Job Location - Disk Buffer<br>Job Not Started to Disk<br>Reserved<br>Job Being Spooled to Disk<br>Job Wholly Contained on Disk<br>Job Larger than Buffering Partition | |
| 3 | Unsigned Bytes | Reserved | |
| 4 | | Size of job, expressed in bytes. (not currently supported) | |
| 4 | Unsigned Double Word | Number of impressions generated for this job.(FFFFFFFF = Unknown)<br>(This number is subject to change until parse complete) | |
| 4 | Unsigned Double Word | Number of pages that are safe for this job. (FFFFFFFF = Unknown)<br>(This number is subject to change until job safe) | |
| 4 | Unsigned Double Word | Number of impressions suppressed(FFFFFFFF = Unknown)<br>(This number is subject to change until job safe) | |
| 4 | Unsigned Double Word | PJL - Start printing at page | |
| 4 | Unsigned Double Word | PJL - End printing at page | |
| 1 | Unsigned Byte | Length of Job Name(j) | |
| j | ASCII | Job Name as specified by the Name Job Command(E0 02) | |
| 1 | Unsigned Byte | Length of User Name(k) | |
| k | ASCII | User Name as specified by the Lexmark Start Job Command(E0 30) | |
| ... | ... | ... | |
| 2 | Unsigned Word | Length of Job Record. Job g | Job g |

TABLE 1-continued 5-5-5 Query Jobs, Active or Queued

Command: Lexmark Extension
Subcommand: Query Jobs, Active or Queued

| Byte | Value - Hex | Description | Notes |
|---|---|---|---|
| 1 | Unsigned Byte | LU ID | |
| 2 | Unsigned Word | Job ID | |
| 1 | Unsigned Byte | Port ID | |
| 1 | Unsigned Byte | Breakable | |
| 2 | Unsigned Word | Parent ID | |
| 2 | Unsigned Word | Processing Time since Start of Job | |
| 1 | Bit Encoded Byte | Job State | |
| | Bit 1 | Delete | |
| | Bit 3 | Held(not currently supported) | |
| 1 | Bit Encoded Byte | Job Location - Link | |
| | Bit 0 | Job Not in Link Buffer | |
| | Bit 1 | Job Waiting in Link Buffer | |
| | Bit 2 | Job is Being Read from Link Buffer | |
| 1 | Bit Encoded Byte | Job Location - Rip | |
| | Bit 0 | Job is Not Current Job | |
| | Bit 1 | Reserved | |
| | Bit 2 | Job is Current Job being Ripped | |
| 1 | Bit Encoded Byte | Job Location - Print Queue | |
| | Bit 0 | Job Not in Print Queue | |
| | Bit 1 | Job Waiting in Print Queue | |
| | Bit 2 | Job is Being Printed | |
| 1 | Bit Encoded Byte | Job Location - Disk Buffer | |
| | Bit 0 | Job Not Started to Disk | |
| | Bit 1 | Reserved | |
| | Bit 2 | Job Being Spooled to Disk | |
| | Bit 3 | Job Wholly Contained on Disk | |
| | Bit 4 | Job Larger than Buffering Partition | |
| 3 | Unsigned Bytes | Reserved | |
| 43 | | Size of job, expressed in bytes.(not currently supported) | |
| 4 | Usigned Double Word | Number of impressions generated for this job.(FFFFFFFF = Unknown) (This number is subject to change until parse complete) | |
| 4 | Unsigned Doubte Word | Number of pages that are safe for this job. (FFFFFFFF = Unknown) (This number is subject to change until job safe) | |
| 4 | Unsigned Double Word | Number of impressions suppressed(FFFFFFFF = Unknown) (This number is subject to change until job safe) | |
| 4 | Unsigned Double Word | PJL - Start printing at page | |
| 4 | Unsigned Double Word | PJL - End printing at page | |
| 1 | Unsigned Byte | Length of Job Name(j) | |
| k | ASCII | Job Name as specified by the Name Job Command(E0 02) | |
| 1 | Unsigned Byte | Length of User Name(k) | |
| k | ASCII | User Name as specified by the Lexmark Start Job Command(E0 30) | |
| 2 | Unsigned Word | Number of non-NPAP, non-INA ports that have data | |
| 1 | Uhsigned Byte | Port ID | |
| ... | ... | ... | |
| 1 | Unsigned Byte | Port ID | |

| ID | Port |
|---|---|
| 0x00 | Parallel |
| 0x01 | Serial |
| 0x02 | Network 1 |
| 0x03 | Network 2 |
| 0x04 | Internal(test pages) |
| 0x05 | Local Talk |

Note: This command is only available in printer specific extension revision level 5 or greater.

Jobs are listed in the order that the printer currently believes the jobs will be processed starting with the job that will complete first. This order may change if a PJL rotate port command is encountered.

If the user/Network Administrator is asking for a list of all job identifiers, then the host 12 sends an NPAP command for a "Job ID List" to the particular printer of interest, and in the illustrated embodiment, this command has a format shown in Table #2, below:

TABLE 2

5-5-8 Job ID List

| | | Command: | Lexmark Extension | |
| | | Subcommand: | Job ID List | |
| Byte | Value - Hex | Description | | Notes |
|---|---|---|---|---|
| | | Host Command | | |
| 1 | A5 | Start of Packet Byte | | Packet Header |
| 2 | 00 05 | Length in Bytes (Does not include these 2 bytes nor the SOP byte) | | |
| 1 | Unsigned Byte | Flag | | |
| 1 | E0 | Command: Lexmark Extension | | |
| 1 | 36 | Subcommand: Job ID List | | Data Field |
| | | Printer Response | | |
| 1 | A5 | Start of Packet Byte | | Packet Header |
| 2 | 00 05 | Length in Bytes (Does not include these 2 bytes nor the SOP byte) | | |
| 1 | Unsigned Byte | Flag | | |
| 1 | E0 | Command: Lexmark Extension | | |
| 1 | 36 | Subcommand: Job ID List | | Data Field |
| 2 | Unsigned Word | Number of Job ID's to be returned(n) | | |
| 2 | Unsigned Word | ID of the job closest to completion | | Job 1 |
| ... | ... | ... | | |
| 2 | Unsigned Word | ID of the job farthest from completion | | Job n |

Note: This command is only available in printer specific extension revision level 5 or greater.

Jobs are listed in the order that the printer currently believes the jobs will be processed starting with the job that will complete first. This order may change if a PJL rotate port command is encountered.

The logic flow is now directed to a decision block 108, where it is determined whether or not a Job Transition Alert has been received at the host computer. If the answer is YES, the logic flow travels to a letter "A" at index numeral 110, which directs the logic flow over to FIG. 4B. On FIG. 4B, a decision block 130 determines if this is the first time that an "alert" has been received from the printer for this particular Job Identifier. If the answer is YES, the logic flow travels to a function block 132 where the host computer sends a query message to obtain full job information. This preferably would be the query job message E033, as per Table #1. In addition, at a function block 134 this job is added to the list box at the host computer's display. After this has been accomplished, the logic flow travels to the letter "D" at index numeral 136, which now directs the logic flow back to decision block 108, where the host "waits" for the next Job Transition Alert to be received.

If the answer at decision block 130 was NO, a decision block 140 determines whether or not the status for a particular print job has changed inside the printer of interest. This decision made at the host is based upon Job Transition Alert messages that are automatically sent by the printer every time one of the jobs within the printer changes status. The type of status change being referred to includes the following: (1) job create, where the printer first receives a job through one of its input ports; (2) start of job processing, where the printer sends the job to one of the interpreters and raster image processing (RIP) is initiated; (3) print start (i.e., where the actual job begins being printed on paper at this printer); and (4) job complete, where the printer has completely finished printing this job. Other possible status change messages could include a confirmation by the printer of interest that a job has been "deleted," or that a job has been "undeleted." If the answer at decision block 140 is YES, the logic flow is directed to a function block 142 in which the job status is updated for the list box at the host's display screen. After this occurs, the logic flow travels to letter "D" at index numeral 136, and arrives back at the detection of a reception of a Job Transition Alert at decision block 108.

If the answer at decision block 140 was NO, the logic flow travels to a decision block 144 where it is determined whether or not the job has been just completed. If the answer is YES, function block 146 removes this particular job from the list box at the host computer. When that occurs, the first job out of the list of twenty-five (25) jobs would be eliminated, and all of the other of the first twenty-five (25) jobs would be indexed to the next lower number. In other words, the job listed as number 5 would become number 4. Furthermore, the 26th job (which may have been previously invisible to the user at the list box display) would now bump up to the 25th position, and full information for this job would then be queried by the host from the printer. After this query has been completed, the full information for this (now 25th position) job could be printed at the list box.

Decision block 144 could potentially answer NO, however, this is extremely unlikely since the logic flow should have previously determined that the job was completed for this particular Job Identifier, and so the logical flow would have never passed through the decision block 140 for this Job Identifier. In any case, the logic flow ends up at letter "D" at index numeral 136, and then is directed back to the decision block 108.

At decision block 108, if a Job Transition Alert has not been received, the logic flow would travel to a decision block 112 which determines whether or not the "delete" button has been pressed. The "delete" button being referred to here is depicted on FIG. 5 at index numeral 162, which will be discussed in more detail hereinbelow. If the answer at decision block 112 is YES, the logic flow travels to a function block 114, and the host sends a request to the printer to delete jobs that have been selected in the list box (which is a window 152 on FIG. 5).

If the answer at function block 112 was NO, the logic flow is directed to a decision block 116, which determines if the "undelete" button has been pressed. If the answer is YES, the logic flow arrives at a function block 118, which sends a request to the printer to "undelete" jobs that have been selected in the list box (i.e., list box 152).

If the answer at decision block 116 was NO, then decision block 120 determines whether or not the "Job Management"

window has been closed. If the answer is NO, the logic flow is directed back to decision block 108. If the answer is YES, the logic flow is directed to a function block 122 which "unregisters" for Job Transition Alerts from this printer. This would be via a message sent by the host to the particular printer for which the host is no longer interested in receiving such information, and after being received by the printer, Job Transition Alerts would be not directed toward this particular host in the future. It will be understood, however, that this same printer may nevertheless send Job Transition alerts to other hosts that are still registered with that printer, via a network. The logic flow on FIG. 4A now arrives at the end of this function (at index numeral 124), and it will be understood that the MARKVISION® computer program will still be operating in a multitasking mode and performing other functions. Furthermore, the MARKVISION program could easily be directed back to the start (at index numeral 100) of the Job Management program at this host.

Figure 5:
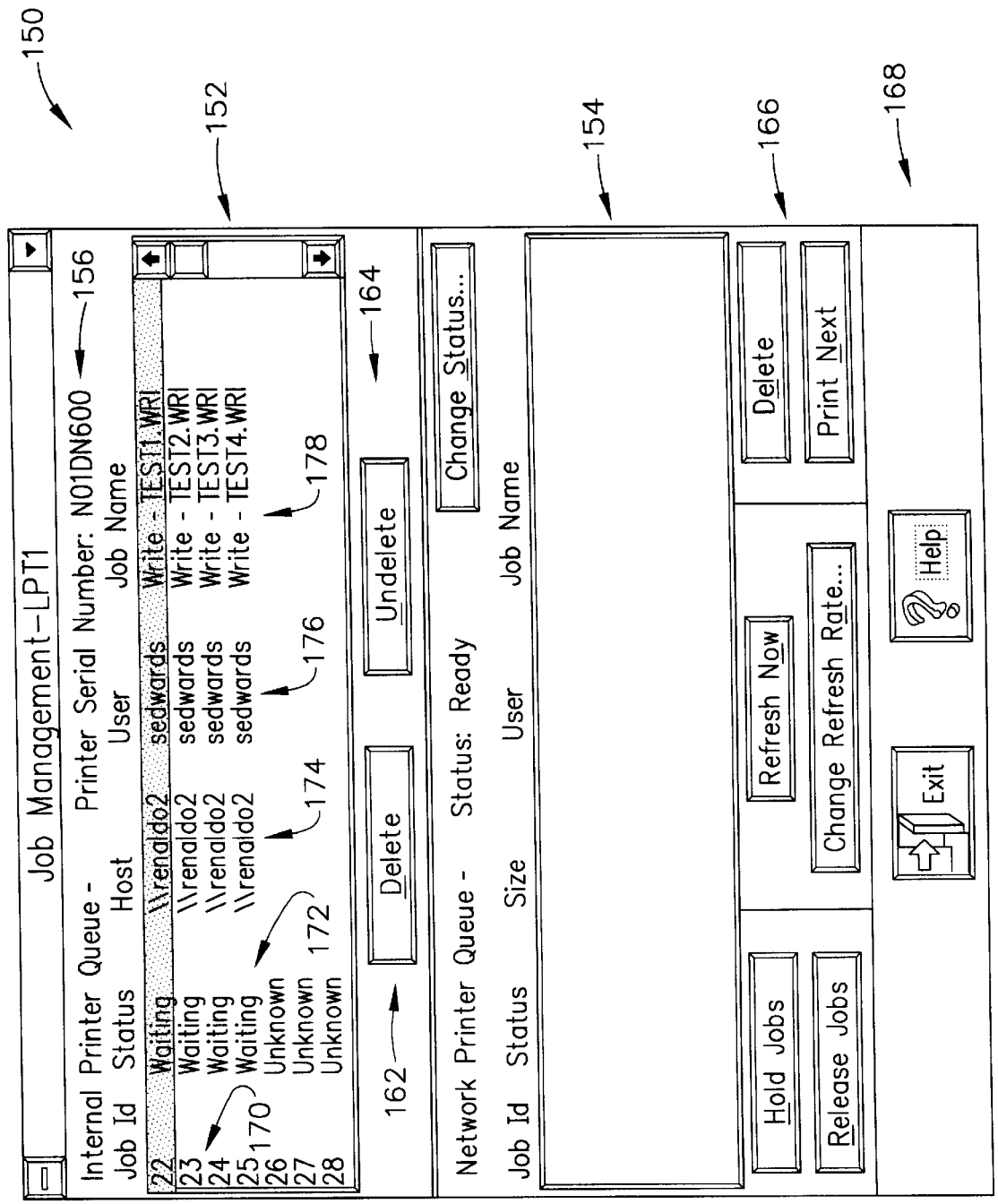
FIG. 5 is a diagrammatic view of one of the display screens of one of the host computers depicted in FIG. 1, showing a "Job Management" screen listing a portion of the internal printer queue of one of the printers in FIG. 1, according to the present invention.

FIG. 5 depicts a monitor display, generally designated by the index numeral 150, which shows a "Job Management" window. Two list boxes, at index numerals 152 and 154, are depicted in window 150, the first list box 152 showing information of jobs that are internal to a particular printer. The second list box 154 would show similar information for jobs that are still in the queue at the host computer and are presently being made ready to be sent over a network to a particular printer. The internal queue Job Management functions of the present invention are more directed to the upper list box 152.

List box 152 would contain information for a single printer at a given moment, and this printer would be identified by its serial number (within a network, for example), as shown at index numeral 156. The information in list box 152 would preferably be shown in column format, as for example, the Job Identifier in the column 170, the Job Status in column 172, the Name of the Host in column 174, the Name of the User in column 176, and the Job Name in column 178. As can be seen in FIG. 5, the status of the first twenty-five (25) jobs could be shown as "waiting" while the 26th job would have a status designated as "Unknown." This is because full information for the first twenty-five (25) jobs in the printer of the illustrated embodiment is available, however full information for the jobs above the number "25" would not be available. It will be understood, however, that all information for all jobs stored in the printer could be transmitted by the printer to the host and displayed in list box 152. It is strictly a matter of design choice as to how many jobs would be maintained on this display.

As related above, the Delete key 162 and Undelete key 164 would typically be placed near list box 152, as shown in FIG. 5. Similar operational keys would typically be provided in the lower list box 154 as shown in the area 166 on FIG. 5. Also, typical Windows-type keys preferably would be included in this display 150, as shown at the bottom of the display at index numeral 168.

Figure 6:
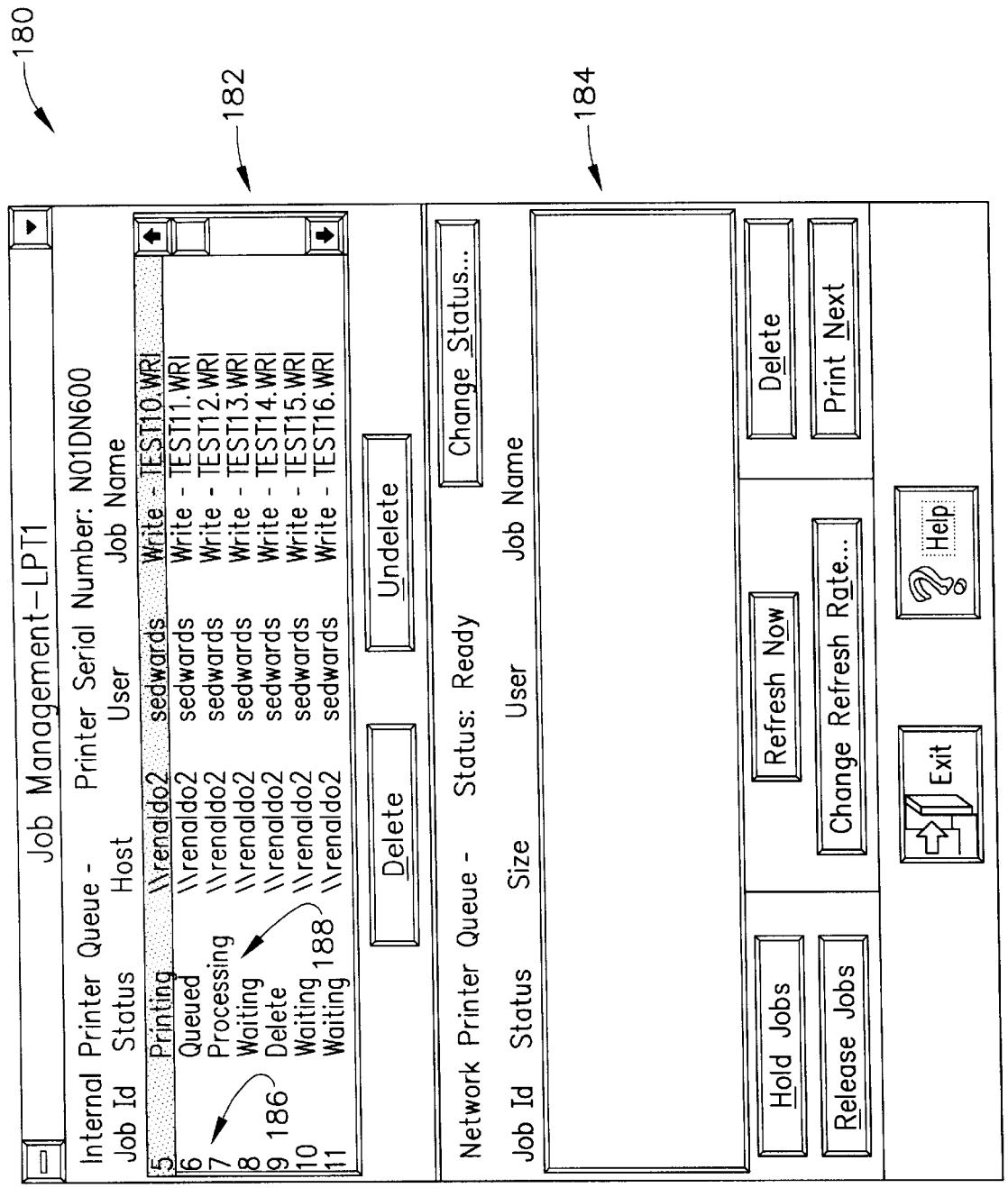
FIG. 6 is diagrammatic view of one of the display screens of one of the host computers depicted in FIG. 1, showing a "Job Management" screen that lists print job data files within the printer's internal queue or at other locations in the printer, while also listing the various types of status that can be associated with print jobs of one of the printers of FIG. 1, according to the present invention.

FIG. 6 shows a monitor screen 180 that has a very similar appearance to the monitor screen 150. A list box 182 corresponds to list box 152, and a list box 184 corresponds to list box 154. FIG. 6 is given as an example as to the different values for Job Identifiers shown in column 186, and different types of job status messages that can be displayed, as shown in column 188. It will be understood that the Job Identifier numbers can be assigned either by the printer or by the host, and these numbers could range up to a very large number in order to prevent "wrapping." In other words, it would not typically be desirable to limit the Job Identifiers to the numerals "1" through "25", merely because only the first twenty-five (25) jobs can be shown with full information in the illustrated embodiment. Instead, the Job Identifiers are best allowed to extend to three or more digits before wrapping, to avoid any potential confusion between the printer and the host computer as to exactly which print job is being referred to by a Job Transition Alert message.

When the Delete button 162 is pressed (i.e., typically by using a mouse or cursor on the Windows-type display 150), the host computer will send an NPAP command for a "delete" job to the particular printer of interest. This delete job command would preferably have a format as shown in Table #3 below.

TABLE 3

5-5-6 Delete Job

| Byte | Value - Hex | Command: Subcommand: Description | Lexmark Extension Delete Job | Notes |
|---|---|---|---|---|
| | | Host Command | | |
| 1 | A5 | Start of Packet Byte | | Packet Header |
| 2 | 00 05 | Length in Bytes (Does not include these 2 bytes nor the SOP byte) | | |
| 1 | Unsigned Byte | Flag | | |
| 1 | E0 | Command: | Lexmark Extension | |
| 1 | 34 | Subcommand: | Delete Job | Data Field |
| 2 | Unsigned Word | ID of the job to discard. | | |
| | | Printer Response | | |
| 1 | A5 | Start of Packet Byte | | Packet Header |
| 2 | 00 05 | Length in Bytes (Does not include these 2 bytes nor the SOP byte) | | |
| 1 | Unsigned Byte | Flag | | |
| 1 | E0 | Command: | Lexmark Extension | |
| 1 | 34 | Subcommand: | Delete Job | Data Field |
| 2 | Unsigned Word | Job ID | | |

Note: This command is only available in printer specific extension revision level 5 or greater.

If a job is wholly contained in the link buffer, then the job will be marked for deletion. The job will be deleted once the job reaches an interpreter but if the job has not reached an interpreter it may be undeleted with the Undelete Job (E0 35) command. If the job is being processed by an interpreter or is being printed or reaches an interpreter in a "delete" state, all of the data for the job will be consumed and, if appropriate, pages that are not in the paper path will be discarded.

If the undelete button 164 is depressed at the host, an NPAP command for an "undelete job" is transmitted by the host to the particular printer of interest. The preferred format for this message is shown in Table #4, below:

TABLE 4

5-5-7 Undelete Job

| Byte | Value - Hex | Command:<br>Subcommand:<br>Description | | Lexmark Extension<br>Undelete Job | Notes |
|---|---|---|---|---|---|
| | | Host Command | | | |
| 1 | A5 | Start of Packet Byte | | | Packet Header |
| 2 | 00 05 | Length in Bytes (Does not include these 2 bytes nor the SOP byte) | | | |
| 1 | Unsigned Byte | Flag | | | |
| 1 | E0 | Command: | Lexmark Extension | | |
| 1 | 35 | Subcommand: | Undelete Job | | Data Field |
| 2 | Unsigned Word | Job ID | | | |
| | | Printer Response | | | |
| 1 | A5 | Start of Packet Byte | | | Packet Header |
| 2 | 00 05 | Length in Bytes (Does not include these 2 bytes nor the SOP byte) | | | |
| 1 | Unsigned Byte | Flag | | | |
| 1 | E0 | Command: | Lexmark Extension | | |
| 1 | 35 | Subcommand: | Undelete Job | | Data Field |
| 2 | Unsigned Word | Job ID | | | |

Note: This command is only available in printer specific extension revision level 5 or greater.

A job may be "undeleted" only if the printer has not started to discard data that is associated with the job.

When the host wants to either "register" or "unregister" with a particular printer, an NPAP command would be transmitted from the host to the particular printer of interest. The registration process logically occurs at function block 104, and the unregistration process logically occurs at function block 122, both described above. The format for this command is preferably that as shown in Table #5, below:

Note: This command is only available in printer specific extension revision level 2 or greater.

A bit value of 1 enables an alert, a value of 0 disables an alert.

Figure 7A:
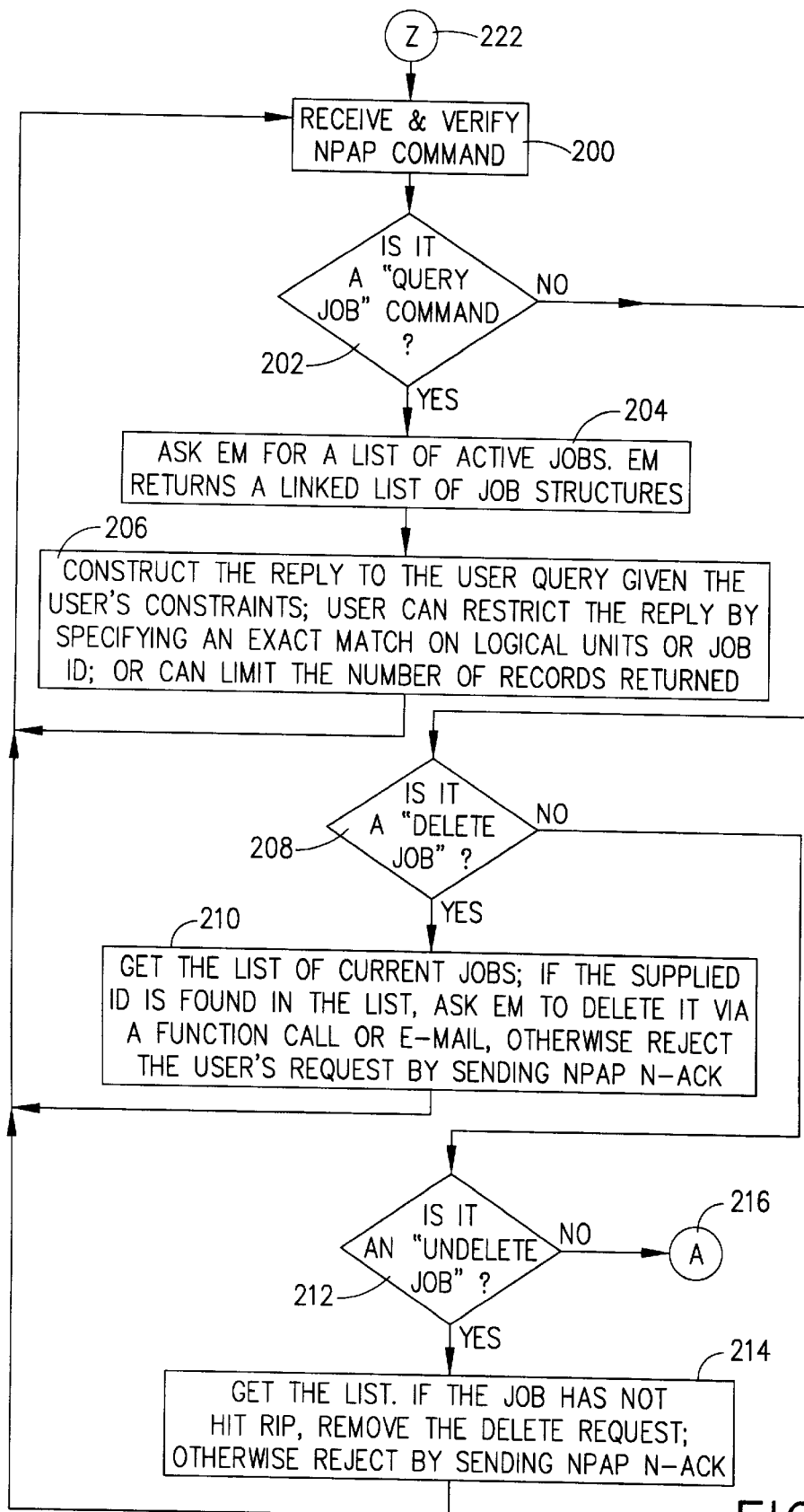
FIGS. 7A and 7B represent a flow chart of a portion of the operation of one of the printers depicted in FIG. 1, showing the logical operational steps required to process an "Internal Queue Job Management" command that is received by the printer, according to the principles of the present invention.

FIG. 7A shows the beginning of a flow chart depicting the logical operations that a printer (e.g., printer 13) containing the internal queue job management features of the present invention would undergo. Starting at a function block 200, the printer would receive an NPAP command via one of its input ports, and an error code would be checked to verify this command. After such a command has been received, a decision block 202 determines whether or not it was a "Query Job" command. If the answer was YES, the logic flow is directed to a function block 204 which asks the

TABLE 5

5-4-3 Register for Lexmark Extension Alerts

| Byte | Value - Hex | Command:<br>Subcommand:<br>Description | | Lexmark Extension<br>Register for Lexmark Extension Alerts | Notes |
|---|---|---|---|---|---|
| | | Host Command | | | |
| 1 | A5 | Start of Packet Byte | | | Packet Header |
| 2 | 00 04 | Length in Bytes (Does not include these 2 bytes nor the SOP byte) | | | |
| 1 | Unsigned Byte | Flag | | | |
| 1 | E0 | Command: | Lexmark Extension | | |
| 1 | 03 | Subcommand: | Register for Lexmark Extension Alerts | | Data Field |
| 1 | Bit Encoded Byte | Job Features Summary<br>Bit 0 - Job Accounting Alert<br>Bit 1 - Flash/Disk Alerts<br>Bit 2 - SNMP Traps<br>Bit 3 - Page Alerts<br>Bit 4 - Partial Page Alerts<br>Bit 5 - Job Transition Alerts<br>Bit 6 - Variable Change Alert<br>Bit 7 - Checksum Alert II | | | |
| | | Printer Response | | | |
| 1 | A5 | Start of Packet Byte | | | Packet Header |
| 2 | 00 03 | Length in Bytes (Does not include these 2 bytes nor the SOP byte) | | | |
| 1 | Bit Encoded Byte | Flag | | | |
| 1 | E0 | Command: | Lexmark Extension | | |
| 1 | 03 | Subcommand: | Register for Lexmark Extension Alerts | | Data Field |

Emulation Manager (EM) of the printer for a list of the active jobs within the printer. The EM returns a linked list of job structures.

In the next step, at a function block 206, the printer constructs the reply message to the user query, given the user's constraints. The user may restrict the reply by specifying an exact match with respect to a "logical unit" (such as a type of interpreter), a job identifier, or they can limit the number of records returned. The reply will be in the form of a message sent back to the host computer, typically via the same path through which the original command was received from the host, which either could be through a network or via a direct connection between the host and the printer.

The job structure contains a "key" that indicates the validity of the list of active jobs. The printer's NPAP task saves the initial value of the key, and then checks it at the beginning of every record that the NPAP task creates for the host. If the key matches, then the list is still valid. If the key does not match, the list is then considered to be invalid. In the case of an invalid list, the NPAP task terminates the list with a null record. In this situation, the printer sends back "blank" data, and the host computer must again ask for a list of the active jobs via a "query job" command. This query job command, in the illustrated embodiment, would be the E033 command, as described above.

The list of active jobs can become invalid in the illustrated embodiment if another component in the system request a list. For example, if the printer's front panel (which would be activated by a human user) request a list, this could affect the validity of the list.

The host's "Query Job, Active or Queued" command (i.e., the E033 command) returns details about the jobs in the printer. The printer's return message to the host would preferably include such information as the job identifier, a "best guess" at the logical unit (e.g., an interpreter) that will be used with this particular job when it becomes processed, and user-defined names. In addition, it will also indicate the "location" of the job. The possible locations within the printer referred to here can include: the input buffer (where the job structures are linked), an interpreter where the job is undergoing raster image processing, and the print queue. In addition, two other criteria can indicate a location of a job, such as a "spooling start" indication (when the printer has started to spool a job), and a "spooling end" indication which would be active either when the printer has finished spooling or in a situation where the printer can't store the entire file (e.g., due to insufficient memory).

As related above, a "Job Transition Alert" is a message that updates the host automatically, once the host has "enabled" this printer for that particular host computer. Job Transition Alerts contain an abbreviated version of the Query Job Active or Queued response, and are transmitted from the printer via a message having a format shown in Table #6, as seen below:

TABLE 6

5-5-17 Job Transition Alert
Printer Alert

| | | Command:<br>Subcommand:<br>Function: | Lexmark Alert<br>Lexmark Extension Alert<br>Job Transition Alert | |
|---|---|---|---|---|
| Byte | Value - Hex | Description | | Notes |
| 1 | A5 | Start of Packet Byte | | Packet Header |
| 2 | 00 0F | Length in Bytes (Does nof include these 2 bytes nor the SOP byte) | | |
| 1 | Unsigned Byte | Flag | | |
| 1 | F0 | Command: | Lexmark Alert | |
| 1 | 03 | Subcommand: | Lexmark Extension Alert | Data Field |
| 1 | 20 | Function: | Job Transition Alert | |
| 1 | Unsigned Byte | LU ID | | Job 1 |
| 2 | Unsigned Word | Job ID | | |
| 1 | Unsigned Byte | Port ID | | |
| 1 | Unsigned Byte | Breakable flag | | |
| 2 | Unsigned Word | Parent ID | | |
| 2 | Unsigned Word | Processing Time since Start of Job | | |
| 1 | Bit Encoded Byte | Job State | | |
| | Bit 1 | Delete | | |
| | Bit 3 | Held(not currently supported) | | |
| 1 | Bit Encoded Byte | Job Location - Link | | |
| | Bit 0 | Job Not in Link Buffer | | |
| | Bit 1 | Job Waiting in Link Buffer | | |
| | Bit 2 | Job is Being Read from Link Buffer | | |
| 1 | Bit Encoded Byte | Job Location - Rip | | |
| | Bit 0 | Job is Not Current Job | | |
| | Bit 1 | Reserved | | |
| | Bit 2 | Job is Current Job being Ripped | | |
| 1 | Bit Encoded Byte | Job Location - Print Queue | | |
| | Bit 0 | Job Not in Print Queue | | |
| | Bit 1 | Job Waiting in Print Queue | | |
| | Bit 2 | Job is Being Printed | | |
| 1 | Bit Encoded Byte | Job Location - Disk Buffer | | |
| | Bit 0 | Job Not Started to Disk | | |
| | Bit 1 | Reserved | | |
| | Bit 2 | Job Being Spooled to Disk | | |
| | Bit 3 | Job Wholly Contained on Disk | | |

TABLE 6-continued 5-5-17 Job Transition Alert
Printer Alert

| | | Command: | Lexmark Alert | |
| | | Subcommand: | Lexmark Extension Alert | |
| | | Function: | Job Transition Alert | |
| Byte | Value - Hex | Description | | Notes |
| --- | --- | --- | --- | --- |
| | Bit 4 | Job Larger than Buffering Partition | | |
| 3 | | Reserved | | |
| 4 | Unsigned Double Word | Size of job, expressed in bytes | | |

Both Job Wholly Contained on Disk and Job Larger than Buffering Partition indicate that the buffering task has seen the end of job. In the first case, the job is stored on disk and can be recovered in case of a power loss. In the second case, the job will not fit on the disk and therefore if a power loss occurs, the job will be lost.

Transition Alerts are returned at Job Create, Rip Start, Print Start, Job Complete and either Wholly Contained on Disk or Job Larger than Buffering Partition.

This Job Transition Alert is sent to all registered hosts when a print job hits a "critical point" in the job's life. These points preferably include the steps of: job create, RIP start, print start, spooling start, and spooling end. The decision as to when a job is "created" occurs at (1) the Internal Network Adapter (INA) for printers that include an INA, (2) the NPAP task in the case for all network jobs and NPAP jobs regardless of which type of port they are received by, or (3) by a combination of the Datastream Manager, Emulation Manager and the interpreters. The RIP start occurs when the Emulation Manager hands the job off to the appropriate interpreter. The print start occurs when the Page Queue Manager first gives the initial page to the Print Engine of the printer. The spooling start indication occurs when the printer has started to spool a job, and the spooling end indication occurs when either the printer has finished spooling or in situations where the printer can't store the entire file (e.g., due to insufficient memory).

Once the reply has been transmitted to the host via function block 206, the logic flow returns to the initial task at function block 200 where new NPAP commands are received and verified. It will be understood that software used in a laser printer such as that of the present invention will typically be multitasking in nature, and will be performing several other tasks virtually simultaneously while the logical processes seem to otherwise be halted at the function block 200.

If the answer at decision block 202 was NO, then the logic flow is directed to a decision block 208 which determines whether or not the received message was a "Delete Job." This would be the E034 command from a host computer. If the answer is YES, then a function block 210 will obtain the list of current jobs, and determine if the supplied (from the host) job identifier is in this list. If so, the Emulation Manager is asked to delete this job via a function call or an E-mail message (within the printer). If this occurs, the logical flow will be directed to a function block 230 on FIG. 8, discussed below in greater detail.

If the host-supplied identifier is not found in the list, the user's request is rejected by this printer, and a "negative-acknowledgment (an N-ACK") NPAP message is sent back to the host. After this has occurred, the logic flow is directed back to the function block 200 where the printer waits for the next NPAP command to be received.

If the answer at decision block 208 was NO, then the logic flow is directed to a decision block 212 that determines whether or not the received NPAP command was an "Undelete Job." This would be the E035 command from a host computer. If the answer is YES, then a function block 214 obtains the list of current jobs and inspects the list to see if the identifier supplied by the host is found within this list. If the job is found, and the job has not yet reached the processing stage (i.e., it has not begun to be RIP-ed), then the previous "delete" request is removed. If the job was not found in the list, or the job has already reached the processing stage, then the user's request is rejected, and an N-ACK NPAP message is sent back to the host computer.

Figure 7B:
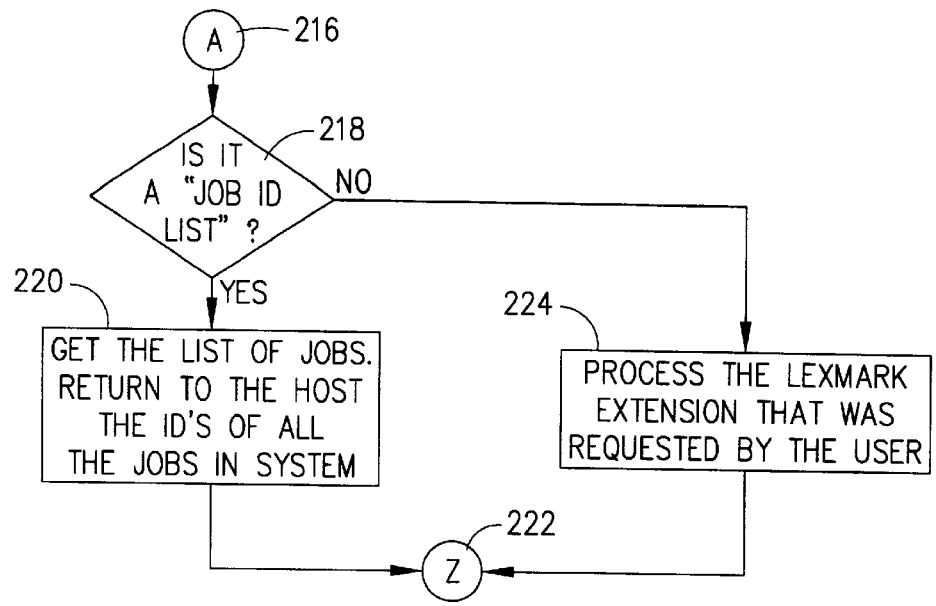

If the answer at decision block 212 was NO, then the logic flow is directed to the letter "A" at index numeral 216. The logic flow continues on FIG. 7B, and is directed to a decision block 218 that determines whether or not the received NPAP command was a "Job ID List" command. In the illustrated embodiment, this would be the E036 command from a host. If the answer is YES, the list of current jobs is obtained from the printer, and all of the identifiers of all jobs in the printer's system are returned to the host via a message from the printer having the format as seen on the bottom portion of Table #2. After that has occurred, the logic flow is directed to the letter "Z" at index numeral 222. The logic flow then arrives back at the top of FIG. 7A, and is directed to function block 200.

If the answer at decision block 218 was NO, the logic flow is directed to a function block 224, and the Lexmark "extension" that was requested by the user is now processed. As related to this invention, this Lexmark extension would be an NPAP command that had nothing to do with a Job Query, a Delete Job, an Undelete Job, or a Job ID List command. The logic flow then arrives at letter "Z" at index numeral 222, and is returned to FIG. 7A.

Figure 8:
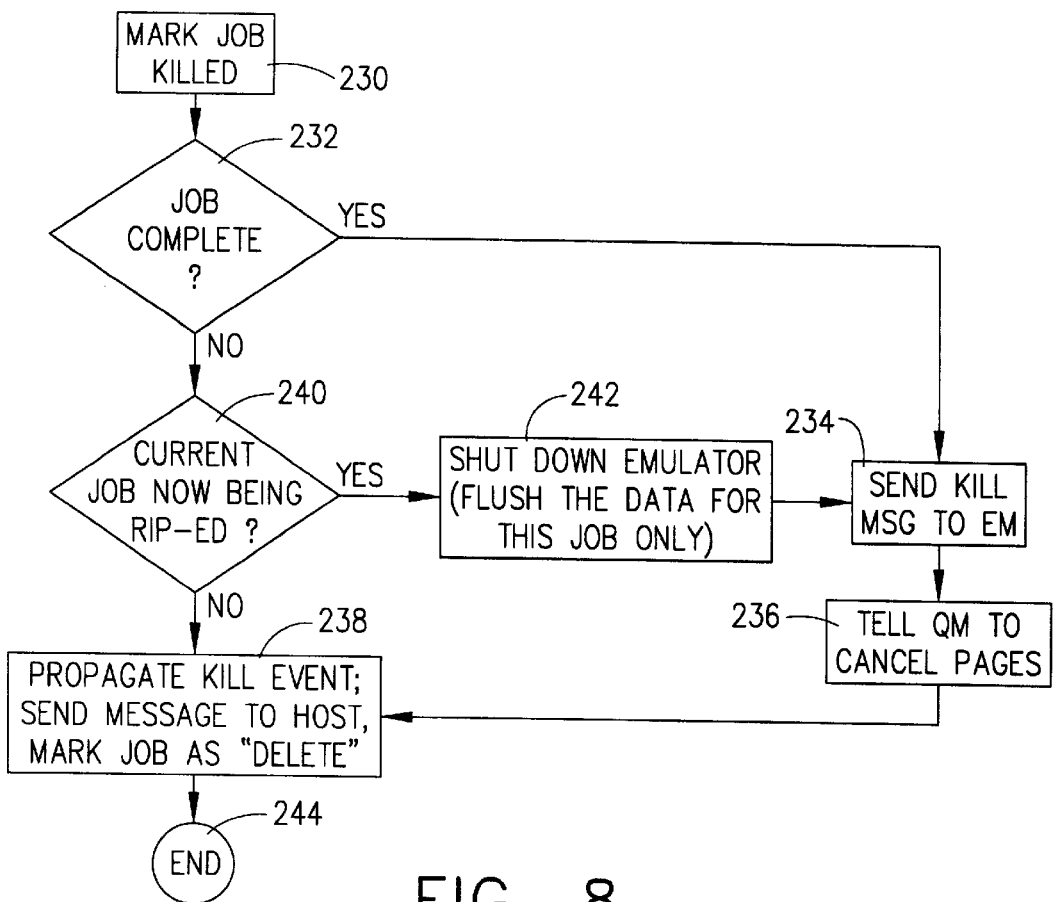
FIG. 8 is a flow chart of a portion of the operation of one of the printers depicted in FIG. 1, showing a further portion of the logical operational steps required to delete a print job that already resides inside the printer, according to the principles of the present invention.

When a Delete Job command has been received from the host (i.e., the E034 command), the logic flow ultimately arrives at function block 230 on FIG. 8 via a function call or an E-mail message. At this time, the job is "marked" as "killed," which becomes an internal flag that is used for various purposes within the printer software of the illustrated embodiment. The logic flow then is directed to a decision block 232 where it is determined whether or not the job has already been completed, typically because it was already processed through an interpreter. If the answer is YES, the logic flow is directed to another function block 234 that sends the "kill" message to the Emulation Manager (EM) of this printer. In the next step, at a function block 236, the Queue Manager (QM) is told to cancel all pages for this job that have not yet been printed. After this has occurred, the logic flow arrives at a function block 238 which propagates the "Kill Event." To propagate the kill event, a message is sent to the host to mark the job as "Delete,"

which would be indicated to the user/Network Administrator at, for example, the display 180 (see FIG. 6), at the status column 188.

If the answer at decision block 232 was NO, then a decision block 240 determines whether or not the current job is presently being processed. If the answer is YES, the logic flow is directed to a function block 242 that shuts down the emulator, which would "flush" the data for this job only. After that, function block 234 sends a Kill Message to the Emulation Manager, function block 236 tells the Queue Manager to cancel all further pages (if any), and the Kill Event is propagated by function block 238.

If the answer at decision block 240 was NO, then the logic flow arrives at function block 238, and the Kill Event is propagated. After the Kill Event has been propagated by function block 238, the logic flow is directed to a task that ends this function call, designated by the index numeral 244.

It will be understood that the precise logical steps described above for operation of the host computer and for the printer could be significantly changed without departing from the principles of the present invention. It will also be understood that the format of the commands and data messages sent between the host computer and the printer could be significantly changed without departing from the principles of the present invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A printing system including a host computer, a printer, and a communications link therebetween, said printing system comprising:

(a) a host computer having a storage medium for holding data, a first memory circuit for temporary storage of data, a first communications port that transmits data, and a first processing circuit that controls the routing of data between said storage medium, first memory circuit, and first communications port;

(b) a printer having a second memory circuit for storage of data including print job information, a second communications port that receives data, a print engine, and a second processing circuit that controls the routing of data between said second memory circuit and second communications port, said second processing circuit also controlling raster image processing of print job information thereby converting said print job information into a bitmap format before being transmitted to said print engine, said second memory circuit being configured to store print job information in a queue, said queue temporarily holding said print job information as separate print jobs until each of said print jobs moves to the head of the queue and becomes the subject of said raster image processing;

(c) said first processing circuit and said first communications port being configured to transmit a "delete" command, by use of an operation entered by a user at said host computer, to said printer, said "delete" command specifying a particular print job in said queue; and (d) said printer being configured to receive said "delete" command, and, after receiving said "delete" command, configured to prevent the print job specified in the "delete" command from becoming the subject of said raster image processing so that this print job is never printed.

2. The system as recited in claim 1, wherein first and second communications ports are each configured to have a bidirectional communications capability, and said first and second processing circuits each include a Network Printing Alliance Protocol processing circuit capable of receiving and transmitting information that conforms to the Network Printing Alliance Protocol.

3. The system as recited in claim 2, wherein said printer automatically updates said host computer, via said first and second communications ports and said communications link, with status information concerning each of the print jobs currently in said queue of the printer.

4. The system as recited in claim 2, further comprising a monitor and a video data link connected between said monitor and said host computer, said host computer being configured to display upon said monitor a list of print jobs currently in said queue of the printer.

5. The system as recited in claim 3, further comprising a monitor and a video data link connected between said monitor and said host computer, said host computer being configured to display upon said monitor a list of print jobs currently in said queue and the status of said queued print jobs.

6. The system as recited in claim 3, wherein said automatic updates are transmitted from said printer to said host computer via Job Transition Alert messages.

7. The system as recited in claim 5, wherein said list of print jobs and their status is derived from a Job Query command transmitted from said host computer to said printer.

8. The system as recited in claim 1, further comprising: (e) said printer being further configured to receive said "delete" command, and, after receiving said "delete" command, configured to prevent the print job specified in the "delete" command, if not still in said queue but presently being printed, from having any further pages being sent to said print engine.

9. A method for remotely accessing an internal queue on a printer that contains print jobs in a printing system that includes a host computer and a printer, said method comprising:

(a) transmitting print job information from a host computer to a printer via a communications link;

(b) storing said print job information in a memory circuit at said printer as a queue, after said print job information is received at said printer, said queue temporarily holding said print job information as separate print jobs until each of said print jobs moves to the head of the queue and becomes the subject of said raster image processing, thereby being converted into a bitmap format before being transmitted to a print engine;

(c) transmitting a user-entered "delete" command from said host computer to said printer, said "delete" command specifying a particular print job in said queue; and (d) receiving said "delete" command at said printer, and preventing the print job specified in the "delete" command from becoming the subject of said raster image processing so that this print job is never printed.

10. The method as recited in claim 9, further comprising: (e) after receiving said "delete" command at said printer, preventing the print job specified in the "delete" command, if not still in said queue but presently being printed, from having any further pages being sent to said print engine.

11. The method as recited in claim 9, further comprising:
(e) providing communications ports with a bi-directional communications capability, connected to said communications link, at each of said host computer and said printer; and
(f) providing a Network Printing Alliance Protocol processing circuit that performs NPAP processing and is capable of receiving and transmitting information that conforms to the Network Printing Alliance Protocol.

12. The method as recited in claim 11, further comprising:
(g) automatically updating said host computer, via said communications link, with status information concerning each of the print jobs currently in said queue of the printer.

13. The system as recited in claim 11, further comprising:
(g) providing a monitor and a video data link connected between said monitor and said host computer, and displaying upon said monitor a list of print jobs currently in said queue of the printer.

14. The system as recited in claim 12, further comprising:
(g) providing a monitor and a video data link connected between said monitor and said host computer, and displaying upon said monitor a list of print jobs currently in said queue and the status of said queued print jobs.

15. The system as recited in claim 12, wherein automatically updating said host computer with status information comprises transmitting Job Transition Alert messages from said printer to said host computer.

16. The system as recited in claim 14, wherein displaying said list of print jobs and their status comprises transmitting a Job Query command from said host computer to said printer.

17. A printing system including a host computer, a printer, and a communications link therebetween, said printing system comprising:
(a) a host computer having a storage medium for holding data, a first memory circuit for temporary storage of data, a first communications port that transmits data, and a first processing circuit that controls the routing of data between said storage medium, first memory circuit, and first communications port;
(b) a printer having a second memory circuit for storage of data including print job information, a second communications port that receives data, a print engine, and a second processing circuit that controls the routing of data between said second memory circuit and second communications port, said second processing circuit also controlling raster image processing of print job information thereby converting said print job information into a bitmap format before being transmitted to said print engine, said second memory circuit being configured to store print job information in a queue, said queue temporarily holding said print job information as separate print jobs until each of said print jobs moves to the head of the queue and becomes the subject of said raster image processing;
(c) said first processing circuit and said first communications port being configured to transmit a "delete" command, by use of an operation entered by a user at said host computer, to said printer, said "delete" command specifying a particular print job in said queue; and
(d) said printer being configured to receive said "delete" command, and, after receiving said "delete" command, further configured to either:
  (i) prevent the print job specified in the "delete" command, if still in said queue, from becoming the subject of said raster image processing; or
  (ii) after receiving an "undelete" command at said printer sent by said host computer, re-establishing in said queue the print job specified in the "undelete" command if that print job's data has not previously been flushed from said queue.

18. The system as recited in claim 17, wherein said printer is configured to prevent the print job specified in the "delete" command from becoming the subject of said raster image processing by flushing the data for that specified print job when it reaches the head of said queue.

19. The system as recited in claim 17, wherein said printer prevents the print job specified in the "delete" command from becoming the subject of raster image processing by marking that print job as being "killed," without immediately physically erasing the portion of said second memory circuit containing that print job.

20. The system as recited in claim 19, wherein after said printer receives said "undelete" command, said printer is further configured to re-establish in said queue the print job specified in the "undelete" command by removing the "killed" attribute, if that print job's data has not previously been flushed from said queue.

21. The system as recited in claim 20, wherein first and second communications ports are each configured to have a bi-directional communications capability, and said first and second processing circuits each include a Network Printing Alliance Protocol processing circuit capable of receiving and transmitting information that conforms to the Network Printing Alliance Protocol.

22. The system as recited in claim 21, wherein said printer automatically updates said host computer, via said first and second communications ports and said communications link, with status information concerning each of the print jobs currently in said queue of the printer.

23. The system as recited in claim 22, further comprising a monitor and a video data link connected between said monitor and said host computer, said host computer being configured to display upon said monitor a list of print jobs currently in said queue of the printer.

24. The system as recited in claim 22, further comprising a monitor and a video data link connected between said monitor and said host computer, said host computer being configured to display upon said monitor a list of print jobs currently in said queue and the status of said queued print jobs.

25. The system as recited in claim 22, wherein said automatic updates are transmitted from said printer to said host computer via Job Transition Alert messages.

26. The system as recited in claim 24, wherein said list of print jobs and their status is derived from a Job Query command transmitted from said host computer to said printer.

27. The system as recited in claim 17, further comprising:
(e) said printer being further configured to receive said "delete" command, and, after receiving said "delete" command, configured to prevent the print job specified in the "delete" command, if not still in said queue but presently being printed, from having any further pages being sent to said print engine.

28. A method for remotely accessing an internal queue on a printer that contains print jobs in a printing system that includes a host computer and a printer, said method comprising:
(a) transmitting print job information from a host computer to a printer via a communications link;

(b) storing said print job information in a memory circuit at said printer as a queue, after said print job information is received at said printer, said queue temporarily holding said print job information as separate print jobs until each of said print jobs moves to the head of the queue and becomes the subject of said raster image processing, thereby being converted into a bitmap format before being transmitted to a print engine;

(c) transmitting a user-entered "delete" command from said host computer to said printer, said "delete" command specifying a particular print job in said queue; and (d) receiving said "delete" command at said printer, and either:
  (i) preventing the print job specified in the "delete" command, if still in said queue, from becoming the subject of said raster image processing; or
  (ii) after receiving an "undelete" command at said printer sent by said host computer, re-establishing in said queue the print job specified in the "undelete" command if that print job's data has not previously been flushed from said queue.

29. The method as recited in claim 28, wherein preventing the print job specified in the "delete" command from becoming the subject of said raster image processing is accomplished by flushing the data for that specified print job when it reaches the head of said queue.

30. The method as recited in claim 28, wherein preventing the print job specified in the "delete" command from becoming the subject of raster image processing comprises marking that print job as being "killed," without immediately physically erasing the portion of said second memory circuit containing that print job.

31. The method as recited in claim 30, further comprising re-establishing in said queue, after receiving said "undelete" command at said printer, the print job specified in the "undelete" command by removing the "killed" attribute, if that print job's data has not previously been flushed from said queue.

32. The method as recited in claim 28, further comprising (e) after receiving said "delete" command at said printer, preventing the print job specified in the "delete" command, if not still in said queue but presently being printed, from having any further pages being sent to said print engine.

33. The method as recited in claim 28, further comprising:
  (e) providing communications ports with a bi-directional communications capability, connected to said communications link, at each of said host computer and said printer; and
  (f) providing a Network Printing Alliance Protocol processing circuit that performs NPAP processing and is capable of receiving and transmitting information that conforms to the Network Printing Alliance Protocol.

34. The method as recited in claim 33, further comprising:
(g) automatically updating said host computer, via said communications link, with status information concerning each of the print jobs currently in said queue of the printer.

35. The system as recited in claim 33, further comprising (g) providing a monitor and a video data link connected between said monitor and said host computer, and displaying upon said monitor a list of print jobs currently in said queue of the printer.

* * * * *